United States Patent
Kim (10) Patent No.: US 12,221,106 B2
(45) Date of Patent: Feb. 11, 2025

(54) SYSTEM AND METHOD FOR CONTROLLING SMART MOBILITY BY RISK LEVEL USING GPS AND CAMERA SENSOR

(71) Applicant: HYUNDAI MOBIS Co., Ltd., Seoul (KR)

(72) Inventor: Seung Jae Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 318 days.

(21) Appl. No.: 17/729,175

(22) Filed: Apr. 26, 2022

(65) Prior Publication Data

US 2022/0371593 A1    Nov. 24, 2022

(30) Foreign Application Priority Data

May 20, 2021   (KR) .................. 10-2021-0065111

(51) Int. Cl.
*B60W 30/18*    (2012.01)
*G06V 20/58*    (2022.01)

(52) U.S. Cl.
CPC ..... *B60W 30/18109* (2013.01); *G06V 20/582* (2022.01); *B60W 2420/403* (2013.01); *B60W 2554/4049* (2020.02)

(58) Field of Classification Search
CPC ..... B60W 30/18109; B60W 2420/403; B60W 2554/4049; B60W 2050/143; B60W 30/09; B60W 50/14; B60W 2300/365; B60W 2556/50; G60V 20/582; G60V 20/58; B60L 2240/12; B60L 2250/10; B60L 3/0015; B60L 2240/622; B60L 2240/642; B62K 3/002; B62J 3/10; B62J 45/41; B62J 50/22; B62M 6/45
USPC .......................................................... 701/70
See application file for complete search history.

(56) References Cited

U.S. PATENT DOCUMENTS

| | | | |
|---|---|---|---|
| 2011/0313617 A1* | 12/2011 | Omote ................... | B60Q 5/008 701/36 |
| 2018/0198955 A1* | 7/2018 | Watanabe ................. | G06T 7/13 |
| 2019/0276013 A1* | 9/2019 | Kim ....................... | B60W 30/09 |
| 2021/0291803 A1* | 9/2021 | Gesang ................. | B60W 10/08 |

FOREIGN PATENT DOCUMENTS

KR    10-2141299 B1    8/2020
KR    10-2021-0017146 A   2/2021

* cited by examiner

*Primary Examiner* — Yi-Kai Wang
(74) *Attorney, Agent, or Firm* — NSIP Law (57) ABSTRACT

A system for controlling a smart mobility by risk level includes: an information collection unit to collect position and speed information of the smart mobility and camera sensing information including a front traffic sign or object; a front detection unit to detect a front obstacle or inclination using the camera sensing information and to output a detection result; a control unit to change a warning to a user and/or a method of controlling the smart mobility by risk level based on the information collected by the information collection unit and the detection result; and a warning unit to warn the user by changing a method by risk level under the control of the control unit.

5 Claims, 7 Drawing Sheets

SYSTEM AND METHOD FOR CONTROLLING SMART MOBILITY BY RISK LEVEL USING GPS AND CAMERA SENSOR

CROSS-REFERENCE TO RELATED APPLICATION

This application claims priority to and the benefit of Korean Patent Application No. 10-2021-0065111, filed on May 20, 2021, the disclosure of which is incorporated herein by reference in its entirety.

BACKGROUND

1. Field of the Invention

The present invention relates to a system and method for controlling a smart mobility by risk level using a GPS and a camera sensor, and more specifically, to a system and method for controlling a smart mobility, which may classify a risk level depending upon information collected through a GPS and a camera sensor and change a warning method or perform an active control depending upon the level.

2. Discussion of Related Art

A smart mobility may be said to be a combination of a personalized means of transportation that uses electricity as power and an intelligent IT technology, and recently, the scope thereof is expanding with the smartization of the conventional means of transportation. With the spread of shared services, the number of users is increasing, and the age group thereof is also expanding, and therefore, accidents are also increasing rapidly. According to the statistics of the Korea Consumer Agency, it is reported that the number of injury cases such as concussions and fractures is also increasing. In order to prevent these serious injuries, it is important to improve the legal system, but it is also urgent to detect accident risks and develop a control technology in response thereto.

The conventional system for detecting the accident risk of the smart mobility may be mounted with an obstacle detection device on one side surface of the mobility so that an alarm sound and obstacle information are output through a user's smart device when a front obstacle is detected during traveling, and therefore, the user may control the traveling direction and the traveling speed, thereby preventing safety accidents. In addition, it is possible to set the obstacle to be recognized in advance to output the alarm sound only for the set obstacle.

However, this system proposes a limited notification method that is mounted with the obstacle detection device so that the alarm sound and the obstacle information are output through the smart device when the obstacle is detected. Therefore, a risky situation may occur when the user is not looking ahead in order to check the smartphone information while traveling. When the response to the obstacle relies on the user and therefore, the user's cognitive ability or attention is reduced, a problem capable of leading to accidents and serious injury occurs despite the alarm sound.

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In order to solve the above problem, the present invention is directed to providing a system and method capable of classifying a risk level based on information collected by a camera sensor and a GPS and controlling a smart mobility depending upon the risk level. More specifically, the smart mobility (e.g., motorized scooter) is mounted with a camera sensor and a GPS module, in which the GPS module mainly collects information on a large area, and the camera sensor collects information of a limited area (front obstacle information) based on the information collected by the GPS module, and then the smart mobility is controlled by classifying the risk level from a first level, which is relatively lower risk, to a third level, which is an emergency, depending upon the information collected by the camera sensor and the GPS module. Caution/warning sounds (auditory feedback) are provided at the first risk level, vibration (tactile feedback) is provided at the second risk level, and an active control (deceleration/braking) is performed at the third risk level.

The object of the present invention is not limited to the aforementioned object, and other objects not mentioned will be clearly understood to those skilled in the art from the following description.

In order to achieve the object, a system for controlling a smart mobility by risk level includes: an information collection unit configured to collect position and speed information of the smart mobility and camera sensing information including a front traffic sign or object; a front detection unit configured to detect a front obstacle or inclination using the camera sensing information and to output a detection result; a control unit configured to change a warning to a user and/or a method of controlling the smart mobility by risk level based on the information collected by the information collection unit and the detection result; and a warning unit configured to warn the user by changing a method by risk level under the control of the control unit.

The system may include a voice guidance unit configured to provide a voice guidance to the user about why an active control is performed under the control of the control unit when the control unit actively intervenes in speed/braking control of the smart mobility.

The information collection unit may include a GPS module configured to collect the position information of the smart mobility in real time to calculate a movement direction and a movement speed of the smart mobility using the position information; and a camera sensor configured to collect the camera sensing information and to transmit the camera sensing information to the GPS module and the front detection unit.

The front detection unit may include an obstacle detection unit configured to analyze the information collected by the GPS module and the camera sensing information to recognize whether a front obstacle is present and a type of the obstacle; and an inclination detection unit configured to calculate a gradient of a slope using the camera sensing information transmitted by the camera sensor, and to determine the slope as having a steep inclination (an obstacle) when the calculated gradient exceeds a set gradient (angle) and to determine having a gradual inclination when the calculated gradient does not exceed the set gradient.

The control unit may be configured to limit a maximum speed of the smart mobility based on the information collected by the information collection unit when the information collection unit determines that the smart mobility has entered an accident risk area.

The control unit may be configured to operate the warning unit to provide an auditory feedback to the user at a first risk level, to operate the warning unit to provide a tactile feedback to the user at a second risk level, and to actively intervene in speed/braking control at a third risk level.

A method of controlling a smart mobility by risk level includes: collecting surrounding information according to current position information of the smart mobility using a GPS; determining whether the smart mobility has entered an accident risk area; adjusting a maximum speed of the smart mobility based on a type of the accident risk area when it is determined that the smart mobility has entered the accident risk area; and performing warning/control/voice guidance by risk level based on the position information and speed information of the smart mobility and front visual information including a front traffic sign or object.

The performing of the warning/control/voice guidance by risk level may include providing an auditory feedback to a user at a first risk level; providing a tactile feedback to the user at a second risk level; and actively intervening in speed/braking control by a control unit at a third risk level.

A method for controlling a smart mobility by risk level includes: collecting camera sensing information including a front traffic sign or object through a camera sensor; checking whether there is a front obstacle based on the camera sensing information; and performing warning/control/voice guidance by risk level when the front obstacle is detected.

The performing of the warning/control/voice guidance by risk level may include providing an auditory feedback to a user at a first risk level; providing a tactile feedback to the user at a second risk level; and actively intervening in speed/braking control by a control unit at a third risk level.

A method of controlling a smart mobility by risk level includes: collecting camera sensing information including a front object through a camera sensor; determining whether a slope is detected by an inclination detection unit using the camera sensing information; controlling a speed of the smart mobility depending upon a gradient of the slope when the slope is detected; and providing a voice guidance about controlling the speed to a user.

The controlling of the speed of the smart mobility depending upon the gradient of the slope may including determining the slope as an obstacle when a gradient calculated using the camera sensing information exceeds a set gradient, and determining the slope as not an obstacle when the calculated gradient does not exceed the set gradient.

Other features and aspects will be apparent from the following detailed description, the drawings, and the claims.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods for achieving them will be made clear from exemplary embodiments described in detail below with reference to the accompanying drawings. However, the present invention is not limited to the disclosed exemplary embodiments but may be embodied in many different forms. These exemplary embodiments are merely provided so that the present invention is complete, and those skilled in the art to which the present invention pertains are fully informed of the scope of the present invention, and the present invention is defined by the claims. Meanwhile, terms used herein are for the purpose of describing one exemplary embodiments and are not intended to limit the present invention. Throughout the present specification, the singular forms also include the plural forms unless the context clearly indicates otherwise. The term "comprise" or "comprising" used in the specification does not preclude the presence or addition of one or more other elements, steps, operations, and/or devices other than stated elements, steps, operations, and/or devices.

Figure 1:
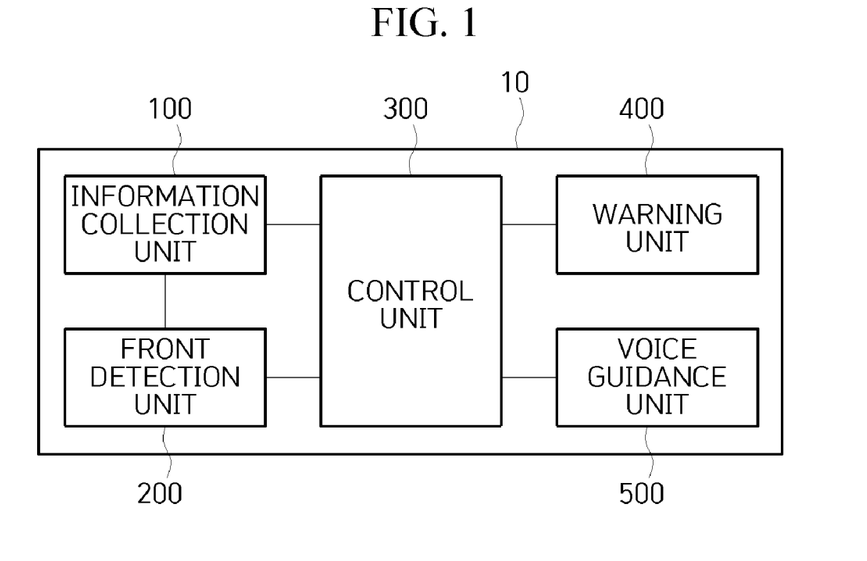
FIG. 1 is a block diagram showing a configuration of a system for controlling a smart mobility by risk level using a GPS and a camera sensor according to one exemplary embodiment of the present invention.

FIG. 1 is a block diagram showing a configuration of a system for controlling a smart mobility by risk level using a GPS and a camera sensor according to one exemplary embodiment of the present invention.

As shown in FIG. 1, a system 10 for controlling a smart mobility by risk level using a GPS and a camera sensor according to one exemplary embodiment of the present invention includes an information collection unit 100, a front detection unit 200, a control unit 300, a warning unit 400, and a voice guidance unit 500.

The information collection unit 100 may collect the position and speed information of the smart mobility and front visual information (camera sensing information) including a front traffic sign or object to determine whether the smart mobility enters an accident risk area, correct a position of the smart mobility using the camera sensing information, or provide the collected information to the front detection unit 200 to detect an obstacle or an inclination. In addition, the information collection unit 100 calculates a distance from the front obstacle based on the position information to provide the calculated distance to the control unit 300 so that it may support the control unit 300 to determine a risk level and perform a control in response thereto.

The front detection unit 200 recognizes the front obstacle or inclination using the camera sensing information and provides this information to the control unit 300 so that it may support the control unit 300 to determine the risk level according to the approach to the front obstacle or inclination and perform a control in response thereto.

When the information collection unit 100 determines that the smart mobility has entered the accident risk area, the control unit 300 limits the maximum speed of the smart mobility depending upon the information provided by the information collection unit 100 or controls the warning/control/voice guidance to be performed by risk level.

For example, when it is determined that the area where the smart mobility enters corresponds to a school zone among the accident risk areas, the control unit 300 may limit the maximum speed of the smart mobility to 50%. Assuming that the maximum speed of a motorized scooter is 30 km/h, the control unit 300 may limit the maximum speed of the motorized scooter to 15 km/h when the motorized scooter enters the school zone.

In addition, when the front detection unit 200 detects a front obstacle to transmit it to the control unit 300, the control unit 300 may provide the warning or the voice guidance to the user by risk level depending upon the approach to the obstacle, or actively control the speed/braking of the smart mobility when the risk level is high.

According to one exemplary embodiment of the present invention, the control unit 300 operates the warning unit 400 to provide an auditory feedback (caution/warning sounds) to the user at a first risk level, the control unit 300 operates the warning unit 400 to provide a tactile feedback (vibration) to the user at a second risk level, and the control unit 300 actively intervenes in the speed/braking control (stop after deceleration) at a third risk level.

For example, when the smart mobility enters the school zone, which is one of the accident risk areas or when it approaches a special zone such as a front of a school or a drop zone, the risk level may increase. In addition, when the smart mobility approaches a crosswalk in the accident risk area, when the smart mobility approaches within 20 m of the crosswalk, the control unit 300 may determine it as the first risk level to cause the warning unit 400 to provide the auditory warning to the user through caution/warning sounds; when the smart mobility approaches within 10 m of the crosswalk, the control unit 300 may determine it as the second risk level to cause the warning unit 400 to provide the tactile warning to the user through vibration; and when the smart mobility approaches within 5 m of the crosswalk, the control unit 300 may determine it as the third risk level to actively perform the deceleration/braking control of the smart mobility.

In addition, when the front detection unit 200 detects a front slope to transmit the information to the control unit 300, the control unit 300 controls the speed of the smart mobility on the slope. In this case, since the speed is decelerated depending upon the inclination, the control unit 300 may control the acceleration of the smart mobility.

The warning unit 400 warns the user by changing the warning method by risk level under the control of the control unit 300. For example, the warning unit 400 may provide the auditory warning to the user through the caution/warning sounds at the first risk level and provide the tactile warning to the user through the vibration at the second risk level.

When the control unit 300 actively intervenes in the speed/braking controls of the smart mobility, the voice guidance unit 500 serves to provide the user with voice guidance about the reason why the active control is performed under the control of the control unit 300. In other words, when the maximum speed limit, acceleration, deceleration, and stop (braking) are performed due to the active intervention of the control unit 300, the control unit 300 allows the voice guidance unit 500 to provide the voice guidance to the user. For example, when the smart mobility enters the school zone and the maximum speed is only limited, the voice guidance unit 500 may provide the voice guidance saying that 'You may travel at 50% of the maximum speed because you have entered a school zone. Your current speed is 12 km/h. Please do not exceed this speed,' and when the deceleration control is actively performed according to the maximum speed limit, the voice guidance unit 500 may provide the voice guidance saying that 'You may travel at 50% of the maximum speed because you have entered a school zone. Your current speed is 21 km/h. Please decelerate to 20 km/h.'

Figure 2:
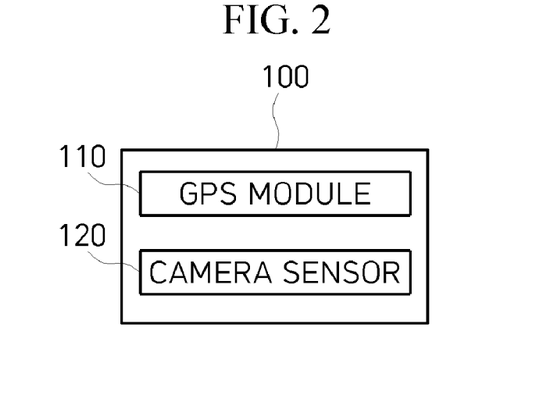
FIG. 2 is a block diagram showing a configuration of an information collection unit of the system for controlling the smart mobility by risk level using the GPS and the camera sensor according to one exemplary embodiment of the present invention.

FIG. 2 is a block diagram showing a configuration of an information collection unit of the system for controlling the smart mobility by risk level using the GPS and the camera sensor according to one exemplary embodiment of the present invention.

As shown in FIG. 2, the information collection unit 100 includes a GPS module 110 and a camera sensor 120.

The GPS module 110 collects the position information of the smart mobility in real time to calculate the movement direction and movement speed of the smart mobility using the collected position information. In addition, the GPS module 110 collects surrounding information according to current position information of the smart mobility. The surrounding information also includes information on whether there is an accident risk area. For example, the accident risk area includes a school zone. In addition, the GPS module 110 corrects the position information of the smart mobility based on the information recognized by the camera sensor 120 when the smart mobility enters the accident risk area. In addition, the GPS module 110 calculates a distance between the crosswalk and the smart mobility when the smart mobility approaches the crosswalk in the accident risk area to transmit the calculated distance to the control unit 300 so that it may support the control unit 300 to classify the risk level based on the distance and control so that the warning/control/voice guidance to the user is performed by level. In addition, when the GPS module 110 determines that the smart mobility is approaching the crosswalk by combining the position information with geographic information, the GPS module 110 provides this information to the obstacle detection unit 210 to detect that the front obstacle appears.

The camera sensor 120 collects front visual information (camera sensing information) including a front traffic sign or object to transmit the visual information to the GPS module 110 so that the GPS module 110 may correct the position information of the smart mobility when the smart mobility enters the accident risk area. In addition, the camera sensor 120 transmits the camera sensing information to the front detection unit 200 so that the front detection unit 200 may determine whether the recognized front object is an obstacle or a slope.

Figure 3:
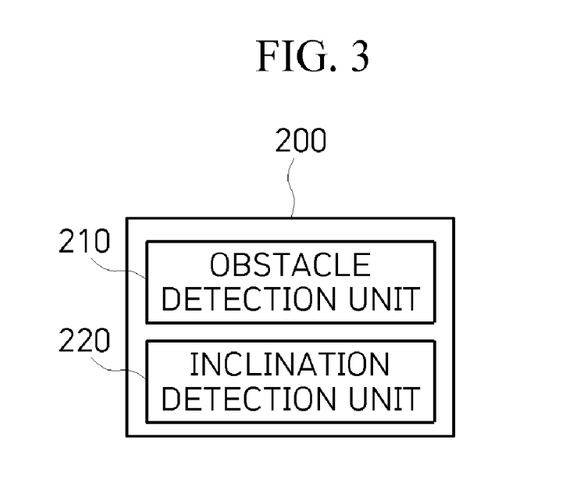
FIG. 3 is a block diagram showing a configuration of a front detection unit of the system for controlling the smart mobility by risk level using the GPS and the camera sensor according to one exemplary embodiment of the present invention.

FIG. 3 is a block diagram showing a configuration of a front detection unit of the system for controlling the smart mobility by risk level using the GPS and the camera sensor according to one exemplary embodiment of the present invention.

The front detection unit 200 includes an obstacle detection unit 210 and an inclination detection unit 220.

The obstacle detection unit 210 comprehensively analyzes the information transmitted by the GPS module 110 and the camera sensing information (the front visual information including the front traffic sign or object) transmitted by the camera sensor 120 to recognize whether the front obstacle appears and the type of the obstacle. The obstacles detected by the obstacle detection unit 210 may include a crosswalk, a barrier, and a pothole.

As a method of detecting that the obstacle is the crosswalk, there are a method using GPS information and a method of recognizing that the obstacle is the crosswalk by detecting a waiting pedestrian, a crosswalk line, and a traffic light from the camera sensing information, and the obstacle detection unit 210 may recognize that the obstacle is the crosswalk by complementarily using the two methods. When an error occurs in the GPS, the obstacle detection unit 210 may recognize that the obstacle is the crosswalk only with the camera sensing information transmitted by the camera sensor 120.

As a method of detecting the barrier, a method of detecting the barrier by recognizing a front height step using the camera sensing information transmitted by the camera sensor 120 may be used. The reason why the barrier should be detected is because a diameter of a wheel of the motorized scooter is generally 8 to 10 inches (20 cm to 25 cm) and in this case, a risky situation may occur even with a low barrier.

As a method of detecting the pothole, a method of detecting the depression or damage to a front road through image analysis using the camera sensing information transmitted by the camera sensor 120 may be used. For example, artificial intelligence techniques such as image processing and supervised learning may be used.

The inclination detection unit 220 calculates a gradient of a slope using the camera sensing information transmitted by the camera sensor 120, and then determines the slope as having a steep inclination when the gradient exceeds a set gradient (angle) to transmit the information to the obstacle detection unit 210 so that the steep inclination is regarded as an obstacle. When the calculated gradient does not exceed the set gradient, the inclination detection unit 220 determines the slope as having a gradual inclination, and transmits gradient information of the front slope to the control unit 300 so that the speed may be controlled depending upon the gradient. The gradient used as a criterion for determining the steep inclination may be set depending upon an uphill angle of the corresponding smart mobility.

When the obstacle such as a crosswalk, a barrier, a pothole, or a steep inclination is detected, the obstacle detection unit 210 transmits the obstacle information to the control unit 300 so that the control by level according to the risk level is performed.

Figure 4:
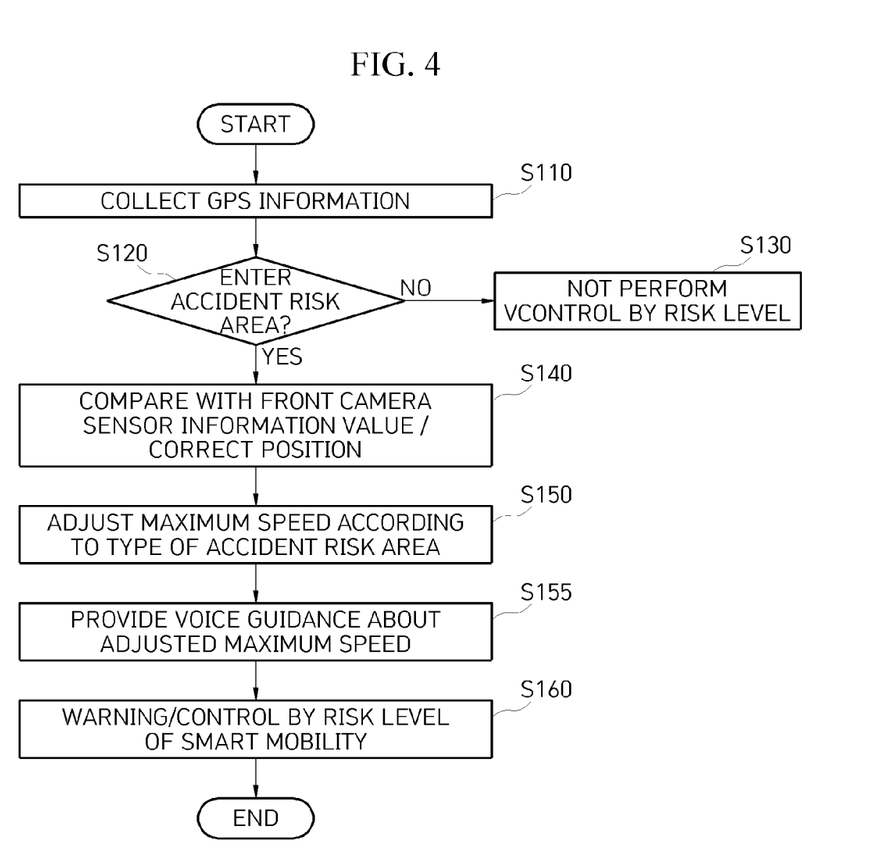
FIG. 4 is a flowchart showing an operation of a case where a smart mobility has entered an accident risk area in a method of controlling the smart mobility according to one exemplary embodiment of the present invention.

Hereinafter, an operation of a case where the smart mobility has entered the accident risk area in the method of controlling the smart mobility according to one exemplary embodiment of the present invention will be described with reference to FIG. 4.

First, the GPS module 110 collects surrounding information according to the current position information of the smart mobility using the GPS. The surrounding information also includes information on whether there is an accident risk area (S110). The accident risk area includes a school zone.

Whether the smart mobility has entered the accident risk area is determined by the GPS module 110 (S120), and when the area where the smart mobility enters is not the accident risk area, the control by level is not performed by the control unit 300 (S130).

When it is determined that the smart mobility has entered the accident risk area, the GPS module 110 corrects the position information of the smart mobility based on the information recognized by the camera sensor 120 when the smart mobility enters the accident risk area (S140).

The control unit 300 adjusts the maximum speed of the smart mobility depending upon the type of the accident risk area (S150). The control unit 300 operates the voice guidance unit 500 so that the voice guidance about the content of the adjusted maximum speed is provided to the user (S155).

The control unit 300 operates so that the warning to the user, the control of the smart mobility, and the voice guidance to the user are performed by risk level depending upon the information (the position and speed information of the smart mobility and front visual information including a front traffic sign or object) provided by the information collection unit 100 (S160). A detailed process of S160 is the same as the description that is described with reference to FIG. 5 below.

Figure 5:
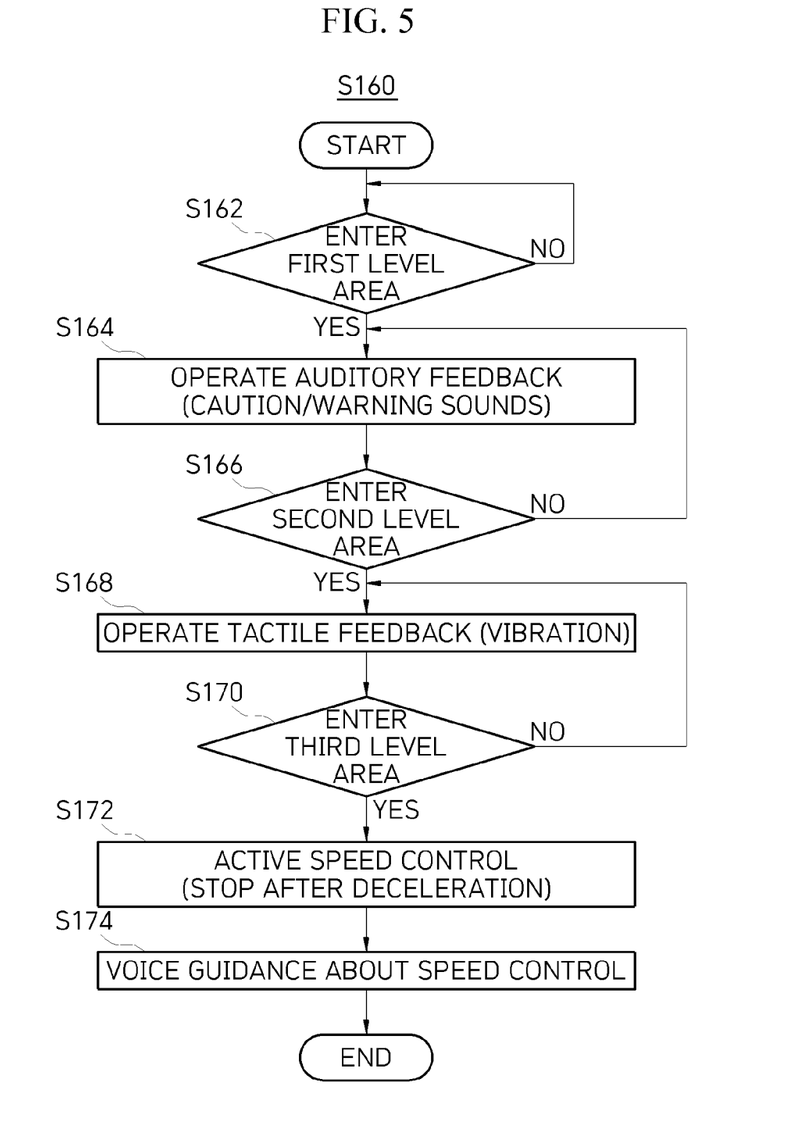
FIG. 5 is a flowchart showing warning/control processes by risk level of the smart mobility according to one exemplary embodiment of the present invention.

Hereinafter, a process in which the warning/control/voice guidance is performed by risk level (S160) according to one exemplary embodiment of the present invention will be described with reference to FIG. 5.

S160 is applied to both a case where the smart mobility has entered the accident risk area and a case where the front obstacle has been detected.

For example, when the smart mobility enters a school zone, which is one of the accident risk areas or when it approaches a special zone such as in front of a school or a drop zone, the risk level may increase. In addition, when the smart mobility approaches a crosswalk in the accident risk area, when the smart mobility approaches within 20 m of the crosswalk, the control unit 300 may determine it as a first risk level; when the smart mobility approaches within 10 m of the crosswalk, the control unit 300 may determine it as a second risk level; and when the smart mobility approaches within 5 m of the crosswalk, the control unit 300 may determine it as a third risk level.

First, when the smart mobility enters the accident risk area or the obstacle is detected, whether the smart mobility has entered the area of the first risk level is determined, and when the smart mobility does not enter the area of the first risk level, the front situation is continuously monitored (S162).

When the smart mobility enters the area of the first risk level, the control unit 300 allows the warning unit 400 to provide the auditory feedback (caution/warning sounds) to the user (S164).

Subsequently, whether the smart mobility has entered the area of the second risk level is determined, and when the smart mobility does not enter the area of the second risk level, the front situation is continuously monitored (S166).

When the smart mobility enters the area of the second risk level, the control unit 300 allows the warning unit 400 to provide the tactile feedback (vibration) to the user (S168).

Subsequently, whether the smart mobility has entered the area of the third risk level is determined, and when the smart mobility does not enter the area of the third risk level, the front situation is continuously monitored (S170).

When the smart mobility enters the area of the third risk level, the control unit 300 actively intervenes in the speed/braking control (stop after deceleration) (S172).

In addition, since the active control has been performed, the control unit 300 allows the voice guidance unit 500 to provide the user with the voice guidance about the speed/braking control (S174).

Figure 6:
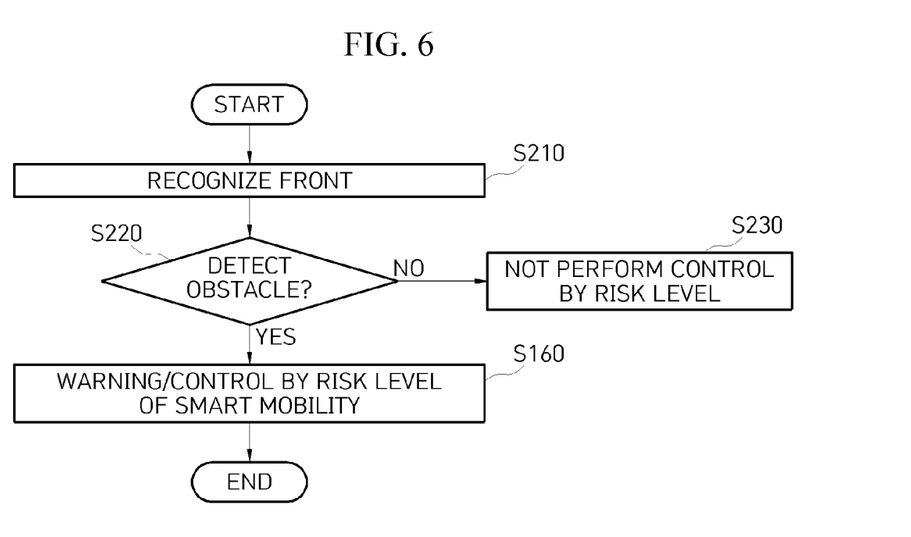
FIG. 6 is a flowchart showing an operation of a case where an obstacle is detected in the method of controlling the smart mobility according to one exemplary embodiment of the present invention.

Hereinafter, an operation of a case of detecting the obstacle in the method of controlling the smart mobility according to one exemplary embodiment of the present invention will be described with reference to FIG. 6.

First, the front is recognized through the camera sensor (S210). In other words, the front visual information (camera sensing information) including the front traffic sign or object is collected. In this process, the crosswalk information collected by the GPS module 110 may be used.

Subsequently, the front detection unit 200 checks whether there is a front obstacle (such as crosswalk/barrier/pothole/steep inclination) depending upon the camera sensing information and the information collected by the GPS module (S220), and when there is no obstacle, the control by level is not performed by the control unit 300 (S230).

When the front detection unit 200 detects the front obstacle, the information on the obstacle is delivered to the control unit 300, and therefore, the warning to the user, the control of the smart mobility, and the voice guidance to the user are performed by the control unit 300 by risk level (S160). The detailed process of S160 is the same as the description that is described above with reference to FIG. 5.

Figure 7:
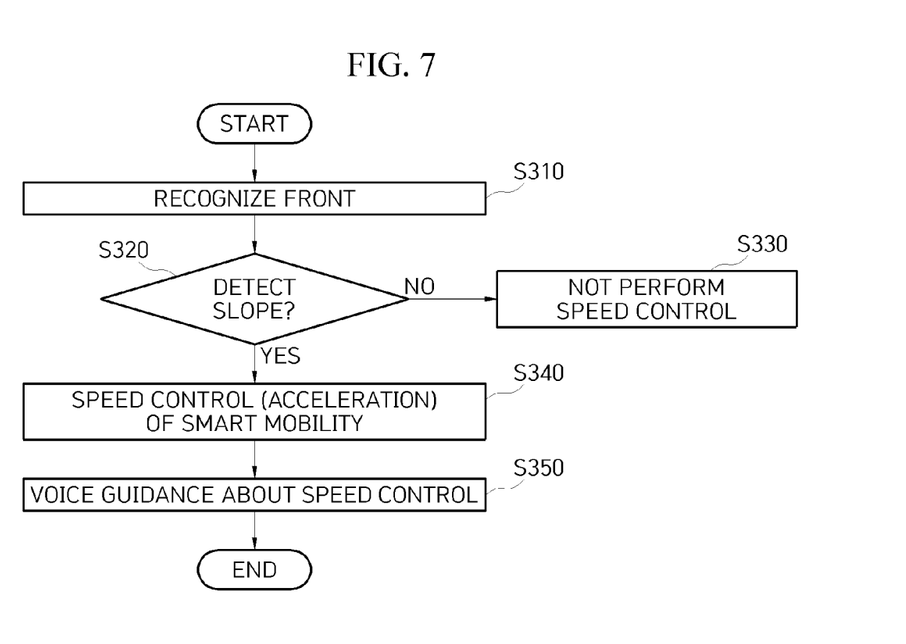
FIG. 7 is a flowchart showing an operation of a case where a slope is detected in the method of controlling the smart mobility according to one exemplary embodiment of the present invention.

Hereinafter, an operation of a case of detecting the slope in the method of controlling the smart mobility according to one exemplary embodiment of the present invention will be described with reference to FIG. 7.

First, the front is recognized through the camera sensor (S210). In other words, the front visual information (camera sensing information) including the front object is collected.

Subsequently, whether the slope is detected by the inclination detection unit 220 using the camera sensing information is determined (S320). When the slope is not detected, speed control by the control unit 300 is not performed (S330).

The inclination detection unit 220 calculates a gradient when there is a front slope using the camera sensing information transmitted by the camera sensor 120, and then determines the slope as having a steep inclination when the calculated gradient exceeds a set gradient (angle) to transmit the information to the obstacle detection unit 210 so that the steep inclination is regarded as an obstacle. When the calculated gradient does not exceed the set gradient, the inclination detection unit 220 determines the slope as having a gradual inclination and transmits the gradient information of the front slope to the control unit 300.

Subsequently, the control unit 300 controls the speed of the smart mobility depending upon the gradient of the front slope (S340). In this case, since the speed is decelerated depending upon the inclination, the control unit 300 may control the acceleration of the smart mobility. For example, when the gradient is 20 degrees, the acceleration may be controlled by 6 km/h, and when the gradient is 10 degrees, the acceleration may be controlled by 3 km/h.

Since the active control of the speed has been performed by the control unit 300, the control unit 300 allows the voice guidance unit 500 to provide the user with the voice guidance about the speed control (S350).

According to one exemplary embodiment of the present invention, not only an electric bicycle, a micro-mobility, an electric wheel, a motorized scooter, a stick board, a push scooter, a roller board, a roller scooter, and a kick scooter board but also all personalized means of transportation using power as a power source are included in the scope of the smart mobility.

For reference, the components according to one exemplary embodiment of the present invention may be implemented in the form of software or hardware such as a field programmable gate array (FPGA) or an application specific integrated circuit (ASIC), and may perform predetermined roles.

However, the term 'components' is not limited to software or hardware, and each component may also be configured to be formed in an addressable storage medium or may also be configured to play one or more processors.

Therefore, for example, the component includes components such as software components, object-oriented software components, class components, and task components, and processes, functions, attributes, procedures, subroutines, segments of program code, drivers, firmware, microcode, circuitry, data, database, data structures, tables, arrays, and variables.

The components and functions provided within the components may be combined into a smaller number of components or further divided into additional components.

At this time, it will be understood that each block of the processing flowchart drawings and combinations of the flowchart drawings may be performed by computer program instructions. Since these computer program instructions may be mounted in a processor of a general purpose computer, a special purpose computer, or other programmable data processing equipment, the instructions performed through the processor of the computer or other programmable data processing equipment generate a means of performing the functions described in the block(s) of the flowchart. Since these computer program instructions may use the computer capable of directing the computer or other programmable data processing equipment in order to implement the function in a particular manner, or may also be stored in a computer readable memory, the instructions using the computer or stored in the computer readable memory may also produce the article of manufacture containing an instruction means of performing the function described in the block(s) of the flowchart. Since the computer program instructions may also be mounted on the computer or other programmable data processing equipment, a series of operational steps are performed on the computer or other programmable data processing equipment to create a process executed by the computer and therefore, the instructions performing the computer or other programmable data processing equipment may also provide the steps for executing the functions described in the block(s) of the flowchart.

In addition, each block may represent a module, a segment, or a part of code that includes one or more executable instructions for executing specified logical function(s). In addition, it should be noted that according to some alternative implementations, the functions described in the blocks are performed regardless of the order. For example, two blocks shown one after another may also be actually performed substantially at the same time, or the blocks may also be sometimes performed in the reverse order depending upon the corresponding function.

At this time, the term '~ unit' used in the present exemplary embodiment refers to software or hardware component such as FPGA or ASIC, and the '~ unit' performs certain roles. However, the '~ unit' is not limited to software or hardware. The '~ unit' may also be configured to be formed in the addressable storage medium and may also be configured to play one or more processors. Therefore, for example, the '~ unit' includes components such as software components, object-oriented software components, class components, and task components, and processes, functions, attributes, procedures, subroutines, segments of program code, drivers, firmware, microcode, circuitry, data, database, data structures, tables, arrays, and variables. The functions provided within the components and the '~ units' may be combined into a smaller number of components and '~ units' or further divided into additional components and '~ units'. In addition, the components and the '~ units' may also be implemented to play one or more CPUs in a device or a security multimedia card.

According to one exemplary embodiment of the present invention, it is possible to prevent accidents for a smart mobility user by providing a system and method for controlling a smart mobility by risk level using a GPS and a camera sensor. In addition, it is possible to build a user-friendly environment by allowing the user to understand the reason why the smart mobility is accelerated/decelerated or stopped by a control system through a voice guidance when the active speed control is performed.

As described above, although the configuration of the present invention has been described in detail with reference to the accompanying drawings, this is merely illustrative, and it is natural that those skilled in the art to which the present invention pertains may variously modify and change the present invention within the scope of the technical spirit of the present invention. Therefore, the scope of the present invention should not be limited to the aforementioned exemplary embodiment and should be determined by the description of the appended claims.

What is claimed is:

1. A system for controlling a smart mobility by risk level, the system comprising:
   an information collection unit configured to collect position and speed information of the smart mobility and camera sensing information including a front traffic sign or object;
   a front detection unit configured to detect a front obstacle or inclination using the camera sensing information and to output a detection result;
   a control unit configured to change a warning to a user and/or a method of controlling the smart mobility by risk level based on the information collected by the information collection unit and the detection result, such that the control unit is configured to change the warning to the user and/or the method of controlling the smart mobility by risk level in both a situation in which the smart mobility has entered an accident risk area and a situation in which the front obstacle has been detected; and
   a warning unit configured to warn the user by changing a method by risk level under the control of the control unit,
   wherein the control unit is configured to limit a maximum speed of the smart mobility based on the information collected by the information collection unit when the information collection unit determines that the smart mobility has entered the accident risk area, and
   wherein the control unit is configured to operate the warning unit to provide an auditory feedback to the user at a first risk level, to operate the warning unit to provide a tactile feedback to the user at a second risk level, and to actively intervene in speed/braking control of the smart mobility at a third risk level.

2. The system of claim 1, further comprising a voice guidance unit configured to provide a voice guidance to the user about why an active control is performed under the control of the control unit when the control unit actively intervenes in speed/braking control of the smart mobility.

3. The system of claim 1, wherein the information collection unit comprises:
   a GPS module configured to collect the position information of the smart mobility in real time to calculate a movement direction and a movement speed of the smart mobility using the position information; and
   a camera sensor configured to collect the camera sensing information and to transmit the camera sensing information to the GPS module and the front detection unit.

4. The system of claim 3, wherein the front detection unit comprises:
   an obstacle detection unit configured to analyze the information collected by the GPS module and the camera sensing information to recognize whether the front obstacle is present and a type of the obstacle; and
   an inclination detection unit configured to calculate a gradient of a slope using the camera sensing information transmitted by the camera sensor, and to determine the slope as having a steep inclination when the calculated gradient exceeds a set gradient (angle) and to determine the slope as having a gradual inclination when the calculated gradient does not exceed the set gradient.

5. A method of controlling a smart mobility by risk level, the method comprising:
   collecting surrounding information according to current position information of the smart mobility using a GPS;
   determining whether the smart mobility has entered an accident risk area;
   collecting camera sensing information including a front traffic sign or object through a camera sensor;
   checking whether there is a front obstacle based on the camera sensing information;
   changing a warning to a user and/or a method of controlling the smart mobility by risk level based on the surrounding information and the camera sensing information, such that the warning to the user and/or the method of controlling the smart mobility by risk level is changed in both a situation in which the smart mobility has entered an accident risk area and a situation in which the front obstacle has been detected; and
   performing warning/control/voice guidance by risk level to the user,
   wherein the controlling includes limiting a maximum speed of the smart mobility when it is determined that the smart mobility has entered the accident risk area, and
   wherein changing the warning includes providing an auditory feedback to the user at a first risk level, providing a tactile feedback to the user at a second risk level, and actively intervening in speed/braking control of the smart mobility at a third risk level.

* * * * *